US011660959B2

(12) United States Patent
Viitasalo et al.

(10) Patent No.: US 11,660,959 B2
(45) Date of Patent: May 30, 2023

(54) METHOD OF OPERATING AN AGRICULTURAL VEHICLE AND A TRANSMISSION ARRANGEMENT FOR AN AGRICULTURAL VEHICLE

(71) Applicant: AGCO International GmbH, Neuhausen (CH)

(72) Inventors: Ville Viitasalo, Suolahti (FI); Raine Kivelä, Suolahti (FI)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/757,582

(22) PCT Filed: Dec. 14, 2020

(86) PCT No.: PCT/IB2020/061881
§ 371 (c)(1),
(2) Date: Jun. 17, 2022

(87) PCT Pub. No.: WO2021/124064
PCT Pub. Date: Jun. 24, 2021

(65) Prior Publication Data
US 2023/0018536 A1    Jan. 19, 2023

(30) Foreign Application Priority Data

Dec. 19, 2019  (GB) ..................................... 1918811
Dec. 19, 2019  (GB) ..................................... 1918813

(Continued)

(51) Int. Cl.
*B60K 17/28*   (2006.01)
*F16H 61/70*   (2006.01)
(Continued)

(52) U.S. Cl.
CPC ........... *B60K 17/28* (2013.01); *F16H 37/065* (2013.01); *F16H 61/702* (2013.01); *B62D 49/06* (2013.01)

(58) Field of Classification Search
CPC ..... B60K 17/28; F16H 37/065; F16H 61/702; B62D 49/06
See application file for complete search history.

(56) References Cited

U.S. PATENT DOCUMENTS 2,881,627 A *  4/1959  Hubert ...................... F16H 3/16
                                                                74/11
4,615,240 A * 10/1986  Weiss ..................... F16H 37/042
                                                                475/221
(Continued)

FOREIGN PATENT DOCUMENTS

GB      2063395 A       6/1981
WO   2011069526 A1    6/2011

OTHER PUBLICATIONS

UK Intellectual Property Office, Search report for related UK Application No. GB1918819.2, dated Jun. 19, 2020.
(Continued)

*Primary Examiner* — Paul N Dickson
*Assistant Examiner* — Timothy Wilhelm (57) ABSTRACT

A method of operating an agricultural vehicle including a range gearbox, an independent PTO system driven from an auxiliary drive shaft and a ground speed PTO system driven from an output shaft of the range gearbox. The method includes transferring torque from the auxiliary drive shaft to the output shaft of the range gear box via the independent PTO system and the ground speed PTO system while drive to the range gearbox is interrupted during a change in the range gear.

10 Claims, 5 Drawing Sheets

(30) Foreign Application Priority Data

Dec. 19, 2019 (GB) ...................................... 1918814
Dec. 19, 2019 (GB) ...................................... 1918819

(51) Int. Cl.
  *F16H 37/06* (2006.01)
  *B62D 49/06* (2006.01)

(56) References Cited

U.S. PATENT DOCUMENTS

| | | | | | |
|---|---|---|---|---|---|
| 4,750,580 | A * | 6/1988 | Umemoto | ............. | F16H 37/043 74/665 GA |
| 5,248,283 | A * | 9/1993 | Eckhardt | ............... | F16H 37/042 74/413 |
| 6,003,391 | A * | 12/1999 | Kojima | ................... | F16H 37/04 192/3.57 |
| 6,190,280 | B1 * | 2/2001 | Horsch | ................. | F16H 37/042 475/209 |
| 6,533,695 | B2 * | 3/2003 | Pollman | .................. | F16H 47/04 475/74 |
| 6,565,471 | B2 * | 5/2003 | Weeramantry | .......... | F16H 47/04 475/82 |
| 6,629,470 | B2 * | 10/2003 | Brancolini | ............. | B60K 17/28 74/15.82 |
| 7,357,745 | B2 * | 4/2008 | Hidaka | ................ | B60K 17/105 475/159 |
| 7,484,580 | B2 * | 2/2009 | Yamaguchi | ............ | B60K 17/28 180/53.6 |
| 7,516,685 | B2 * | 4/2009 | Ebihara | .................. | B60K 17/28 74/606 R |
| 7,900,737 | B2 * | 3/2011 | Isogai | ..................... | F16H 59/06 180/53.4 |
| 8,166,837 | B2 * | 5/2012 | Buhrke | .................. | B60K 17/28 74/15.82 |
| 8,313,406 | B2 * | 11/2012 | Braford, Jr. | ............... | F16H 3/60 475/218 |
| 9,033,077 | B2 * | 5/2015 | Kurkinen | ............... | B60W 10/08 417/364 |
| 9,097,329 | B2 * | 8/2015 | Viitasalo | ............... | F16H 57/033 |
| 9,506,552 | B2 * | 11/2016 | Fukunaga | ............. | B60K 17/28 |
| 2008/0214348 | A1 | 9/2008 | Hasegawa et al. | | |
| 2010/0151984 | A1 * | 6/2010 | Viitasalo | ................. | F16H 47/04 475/269 |

OTHER PUBLICATIONS

European Patent Office, International Search Report related to International Patent Application No. PCT/IB2020/061881, dated Feb. 17, 2021.

* cited by examiner

METHOD OF OPERATING AN AGRICULTURAL VEHICLE AND A TRANSMISSION ARRANGEMENT FOR AN AGRICULTURAL VEHICLE

FIELD OF THE INVENTION

The present invention relates to a method of operating an agricultural vehicle. In particular, the invention relates to a method of operating an agricultural vehicle to reduce interruption of drive or power flow to the driving wheels during changes in range gear. The present invention also relates to a transmission arrangement for an agricultural vehicle suitable for use in such a method.

TECHNICAL BACKGROUND

Tractor transmissions often have a large number of gears and usually have a number of speed gears and a number of gear ranges. For example there may be four speed gears 1, 2, 3 and 4 from slow to fast, and four ranges A, B, C and D from low to high.

The gear ranges are also referred to as Work Areas and assist in optimizing the efficiency of the engine and transmission, allowing a more economical drive. Each Work Area may begin from zero and offer stepless speed adjustment. In one known example, the transmission has four work areas, for example:
Work Area A
For heavy pulling/special crops
0-9 km/h
For the heaviest jobs, like low-speed tillage or special crop harvesting
Ideal when high pulling power is needed continuously, or when precise speed adjustments are needed
Extremely high pulling power with PTO-driven trailers.
Work Area B
For field work
0-18 km/h
Universal field work range
Ideal from seeding and faster tillage up to different forage operations
Easy control of different operations (like harvesting speeds)
Also suitable for transporting in the forest.
Work Area C
For fast working
0-27 km/h
Ideal when transporting in field conditions
Suitable for many municipality applications
Efficient starting with heavy loads.
Work Area D
For road transport
0-50 km/h
Ideal for road transport at high speeds.

In one known arrangement, a range gearbox has an input shaft which is selectively drivable by the prime mover of the vehicle via a clutch arrangement. Two or more input stage gears are rotatably mounted to the input shaft and a first gear selection arrangement is operative to selectively lock any one of the input stage gears to the input shaft to transmit drive between the input shaft and the selected input stage gear. An output shaft is aligned parallel to the input shaft. The output shaft has two or more output stage gears rotatably mounted to the output shaft and a second gear selection arrangement is provided to selectively lock any one of the output stage gears to the output shaft to transmit drive between the selected gear and the output shaft. A lay shaft is arranged between and parallel to the input and output shafts. The lay shaft carries a number of fixed gears which are constantly meshed with the selectable input and output stage gears so that when one each of the input and output stage gears is selected, torque is transmitted from the input shaft to the output shaft via the selected gears and the lay shaft. By selecting different combinations of input stage gears and output stage gears a variety of gear ratios are provided. Typically, the range gearbox shifts the input and output stage gears independently and/or sequentially.

It is also well known to provide a tractor with a power take off (PTO). A tractor may have more than one PTO, for example a front and rear PTO.

The one or more PTO is generally a shaft driven from the tractor's prime mover to 30 transfer mechanical drive to an attached implement, for example a baler rotary harrows, fertilizer spreaders, sprayer pumps. Implement manufacturers now manufacture implements to run at one of three standard speeds, namely, 540 rpm, 1000 rpm, and ground speed. The term "ground speed" means that the rate of rotation of the PTO output shaft is proportional to the speed at which the tractor travels across the ground. Since implements are manufactured to these standards, it is necessary for tractors to be provided with PTO output shafts which are rotated at the required speed. PTO gearboxes have been developed which provide for the selection of different speeds, e.g. 1000 rpm, 540 rpm, ground speed. For ease of reference, a PTO arrangement which is intended to provide an output at one or more set rotational speeds, e.g. 540 rpm, 1000 rpm, will be referred to hereinafter as an "independent" PTO as the speed of the PTO output shaft is independent of the ground speed of the vehicle.

In the case of an independent PTO, the drive for the PTO is often taken from an auxiliary drive shaft driven from the prime mover. In this case, a PTO gearbox is provided which will produced the desired output speed of the PTO output shaft at a given engine speed. The gearbox may provide a number of selectable gear ratios so that different PTO output shaft speeds can be selected by the user. The chosen engine speed is selected by the vehicle manufacturer and is usually a speed towards the maximum engine speed, thereby permitting engine speed to fall as load on the PTO output shaft increases. Where the load on the PTO output shaft is relatively low, the torque back up provided by running the engine at a high speed is not required. It is therefore not efficient to run the engine at high speed. In order to overcome this problem, tractor manufacturers often provide what is known as an economy PTO drive mode in which the gear train is arranged to drive the PTO output shaft at the desired speed at an engine speed of about two thirds maximum speed. This improves fuel economy and the engine runs more quietly at slower speeds.

In order to provide a ground speed PTO, drive for the PTO output shaft may be taken from part of the vehicle transmission which rotates at a speed proportional to the ground speed of the vehicle. In some known arrangements, drive for a ground speed PTO is taken from the output shaft of the range gearbox.

Where both an independent PTO and a ground speed PTO option is provided, these may be delivered through a common PTO output shaft using clutch arrangements to selectively engage an independent, fixed speed drive from the auxiliary shaft or a ground speed drive taken from the output shaft of the range gearbox. In this case, a PTO gearbox is generally provided through which drive from the auxiliary drive shaft and from the range gearbox output shaft is routed to the PTO output shaft.

Modern tractors may also be provided with a power shuttle gearbox to allow for easy switching between forward and reverse travel and a power shift transmission (PS) or a continuously variable transmission or (CV) transmission as discussed in more detail below. Where provided, these are typically located in the drivetrain between the prime mover and the range gearbox and include clutch arrangements which are operative to selectively transmit drive to the input shaft of the range gearbox.

Tractors are often used in applications where frequent changes between forward and reverse gears are required, for example loading work or cultivation work. To avoid repeated de-clutching, the power shuttle gearbox was developed. The power shuttle gearbox allows the driver of a vehicle to change the direction of travel from forward to reverse or vice versa simply by pressing a button or pulling a lever. This eliminates the need for the driver to use the clutch pedal to initiate a change of direction gear change. Some power shuttle gearboxes also allow gearshifts from neutral to a forward gear, or neutral to a reverse gear to be executed.

One type of power shuttle gearbox requires hydraulic actuation of a clutch. The performance of such a power shuttle gearbox is influenced by the time taken for the hydraulic actuator to move the clutch pack from its biting point to its fully engaged position. This is known as clutch take up. Changing the duration of this period changes the aggressiveness of clutch take up, and therefore the aggressiveness with which drive is taken up.

The provision of a power shuttle gearbox means that the transmission can provide the same number of forward gears as there are reverse gears. For a 4 speed 4 range transmission with power shuttle, this would be described as having a "16×16" transmission. Alternatively, a tractor may have a four range transmission with six speed ears, therefore having twenty four speeds, including power shuttle would give twenty four forward gears and twenty four rear gears or a "24×24" transmission.

In addition, modern tractors are usually provided with either a power shift transmission (PS) transmission or a continuously variable transmission or (CV) transmission.

A CV transmission may use belts to transfer power from the tractor engine to the driving wheels, or other ground engaging driving means such as tracks, using an essentially infinite number of speeds.

For simplicity, reference will be made herein to "wheels" or "driving wheels". However, it should be understood that these terms are intended to also cover other ground engaging means which can be used to drive a vehicle across the ground, such as ground engaging tracks, unless the context requires otherwise.

A PS transmission operates within a given range of a transmission and permits shifting under load. Generally with a PS transmission an operator selects an engine speed and an appropriate gear for a specific task, and then when the load increases the engine speed drops and the operator can change to a more appropriate gear.

PS transmissions reduce the torque interruption during the shifting procedure to a minimal duration, but, nevertheless during the shifting procedure/gear change there is necessarily a brief interruption in drive to the wheels due to the disengaging of one gear and the engagement of the next gear.

When there is significant load on a vehicle transmission, interruption of torque delivery to the driving wheels may cause undesirable/uncomfortable operating conditions, such as jerky/stuttering/interrupted vehicle motion. This undesirable operating condition is particularly pronounced and problematic when there is a significant drag load on a vehicle. For instance, when a tractor is pulling a plough, engagement of the plough with the ground effectively acts as an anchor to slow progress of the vehicle. When drive is temporarily interrupted during the gear shifting process, the vehicle tends slow very quickly. However, the drag load is quickly overcome when the gear change is complete and drive is reinstated. This causes an undesirable staccato operating and driving nature and may put undue and excessive wear on transmission and driveline components which may lead to component fatigue and early failure. Other implements often used with a tractor can cause a similar drag load as can towing a heavy trailer, especially uphill.

A PS transmission may enable gear shifting under load, while reducing interruption in the torque transmitted between the engine and driving wheels. This is usually achieved by employing selectively engageable clutch means for each gear, or a pair of clutches for two drive shafts connected to respective sets of gears, and further clutch means for connecting said gears to an output shaft. However, generally there is still a period where torque transmitted between the engine and wheels is briefly interrupted. The interruption of drive to the wheels is a particular issue when changing range gear.

It is an object of the present invention to provide a vehicle transmission which overcomes, or at least mitigates the problems of the known vehicle transmissions. In particular, it is an objective of the present invention to provide a transmission where interruption of drive or power flow to the driving wheels during changes in range gear is reduced.

It is also an objective to provide a method of operating an agricultural vehicle such as a tractor which overcomes, or at least mitigates the problems of the known methods. In particular, it is an objective of the present invention to provide a method of operating an agricultural vehicle where interruption of drive or power flow to the driving wheels during changes in range gear is reduced.

SUMMARY OF THE INVENTION

In accordance with an aspect of the invention, there is provided a method of operating an agricultural vehicle comprising a range gearbox, an independent PTO system driven from an auxiliary drive shaft and a ground speed PTO system driven from an output shaft of the range gearbox, the method comprising transferring torque from the auxiliary drive shaft to the output shaft of the range gear box via the independent PTO system and the ground speed PTO system during a change in the range gear.

Advantageously, the method according to this aspect of the invention can be used to transfer torque from the auxiliary shaft to the range gearbox output shaft to prevent, or at least reduce, the interruption of driving torque to the driving wheels or other ground engaging members when the range gearbox is shifting between gears.

The transfer of torque from the auxiliary shaft to the output shaft of the range gear box may overlap with the interruption of torque to the range gearbox input shaft during a change in range gear.

In an embodiment, the independent PTO system includes an independent PTO clutch engageable to transfer torque to the independent PTO system from the auxiliary drive shaft and the ground speed PTO system comprises a ground speed PTO clutch engageable to transfer torque between the output shaft of the range gearbox and the ground speed PTO system; the method comprising engaging both the independent PTO clutch and the ground speed PTO clutch to transfer torque from the auxiliary drive shaft to the output shaft of the range gear box system. The method may comprise engaging the independent PTO and ground speed PTO clutches at the same time or at different times. The method may comprise engaging one of the independent PTO and ground speed PTO clutches prior to a change in range gear and controlling the transfer of torque from the auxiliary shaft to the output shaft of the range gear by engaging and disengaging the other of the PTO clutches when a change in the range gear is being effected.

The independent PTO system and the ground speed PTO system may be operatively connected with a common PTO output shaft in such a way that torque will always be transferred to the independent PTO system to the ground speed PTO system when the independent PTO clutch is engaged. However, in other embodiments, the independent and ground speed PTO systems share a common PTO output shaft and are configurable to enable torque to be transferred between the independent PTO system and the ground speed PTO system. In this case, the method comprises configuring the independent and ground speed PTO systems such that torque can be transferred between the independent PTO system and the ground speed PTO system. The method may comprise configuring the independent and ground speed PTO systems such that torque can be transferred between the independent PTO system and the ground speed PTO system prior to a change in range gear and controlling the transfer of torque from the auxiliary shaft to the output shaft of the range gear by engaging and disengaging the PTO clutches when a change in the range gear is being effected. The method may comprise configuring the independent and ground speed PTO systems such that torque can be transferred between the independent PTO system and the ground speed PTO system and engaging one of the independent PTO and ground speed clutches prior to a change in range gear and controlling the transfer of torque from the auxiliary shaft to the output shaft of the range gear by engaging and disengaging the other of the PTO clutches when a change in the range gear is being effected.

According to a further aspect of the invention, there is provided a method of operating an agricultural vehicle comprising a range gearbox having an input shaft driveably connectable to a prime mover of the vehicle, an output shaft driveably connected to the input shaft to provide a number of drive ratios and operable in use to provide drive to at least one ground engaging member of the vehicle; an auxiliary drive shaft driveably connectable to the prime mover independently of the range gearbox input shaft; a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative in use for transferring drive from the independent PTO input shaft to the PTO output shaft when the independent PTO clutch is engaged and for transferring drive from the ground speed PTO input shaft to the PTO output shaft when the ground speed PTO clutch is engaged, the PTO gear arrangement being configured or configurable to enable torque from the independent PTO input shaft to be transferred to the ground speed PTO input shaft; the method comprising transferring torque from the auxiliary drive shaft to the output shaft of the range gear box during a change in the range gear by engaging both the independent PTO clutch and the ground speed PTO clutch with the PTO gear arrangement configured to establish a torque transmission drive path between the independent PTO input shaft and the ground speed PTO input shaft.

Advantageously, the method according to this aspect of the invention can be used to transfer torque from the auxiliary shaft to the range gearbox output shaft to prevent, or at least reduce, the interruption of driving torque to the driving wheels or other ground engaging members when the range gearbox is shifting between gears.

Where the PTO gear arrangement is configured such that a torque transmission drive path is permanently established between the independent PTO input shaft to the ground speed PTO input shaft to enable the transfer of torque between them, the step of configuring the PTO gear arrangement to establish such a torque transmission drive path can be omitted.

In other arrangements where a torque transmission drive path between the independent PTO input shaft and the ground speed PTO input shaft is only available when the gear arrangement is in a suitable configuration, the method may comprise configuring the gear arrangement to establish a torque transmission drive path between the independent PTO input shaft and the ground speed PTO input shaft if this is not already the case. This step is typically taken before both PTO clutches are engaged to transmit torque from the auxiliary drive shaft to the output shaft of the range gearbox.

The method may comprise the step of configuring the gear arrangement to establish a torque transmission drive path between the independent PTO input shaft and the ground speed input shaft and subsequently actuating the independent PTO and ground speed PTO clutches to control the transfer of torque from the auxiliary driveshaft to the output shaft of the range gearbox as required during changes in range gear. The method may comprise the step of configuring the gear arrangement to establish a torque transmission drive path between the independent PTO input shaft and the ground speed input shaft prior to a change in range gear. The method may comprise configuring the independent and ground speed PTO systems such that torque can be transferred between the independent PTO system and the ground speed PTO system and engaging one of the independent PTO and ground speed PTO clutches prior to a change in range gear and controlling the transfer of torque from the auxiliary shaft to the output shaft of the range gear by engaging and disengaging the other of the PTO clutches as required during subsequent changes in range gear.

In an embodiment, the PTO gear arrangement includes at least one optionally selectable gear which must be engaged to establish a torque transmission drive path between the independent PTO input shaft and the ground speed PTO input shaft, the step of configuring the PTO gear arrangement to establish a torque transmission drive path between the independent PTO input shaft and the ground speed PTO input shaft comprising engaging said at least one gear.

In an embodiment, the ground speed PTO input shaft is permanently coupled with the PTO output shaft, the PTO gear arrangement comprising at least one independent PTO input gear fixed rotationally fast with the independent PTO input shaft and at least one independent PTO output gear rotatably mounted about the PTO output shaft in constant meshing engagement with said at least one independent PTO input gear and a gear selection arrangement for selectively locking said at least one independent PTO output gear for rotation with the PTO output shaft; wherein the step of configuring the PTO gear arrangement to establish a torque transmission drive path between the independent PTO input shaft and the ground speed PTO input shaft comprises operating said gear selection arrangement to lock said at least one independent PTO output gear for rotation with the PTO output shaft.

In an embodiment, the PTO gear arrangement comprises a first shaft rotatably mounted about the PTO output shaft and a first gear selection arrangement for selectively locking said first shaft to the PTO output shaft for rotation therewith, a ground speed PTO output gear being fixed for rotation with said first shaft and drivingly coupled with a further gear fixed for rotation with the ground speed PTO input shaft; at least one independent PTO output gear rotatably mounted to said first shaft and a second gear selection arrangement for selectively locking said at least one independent PTO output gear for rotation with said first shaft, said at least one independent PTO output gear being in permanent meshing engagement with an independent PTO input gear fixed for rotation with the independent PTO input shaft; wherein the step of configuring the PTO gear arrangement to establish a torque transmission drive path between the independent PTO input shaft and the ground speed PTO input shaft comprises actuating the second gear selection arrangement to lock said at least one independent PTO output gear rotationally fast with said first shaft.

In an embodiment, the PTO gear arrangement comprises first and second PTO output gears rotatably mounted on the PTO output shaft and a first gear selection arrangement for selectively locking either one of said first and second PTO output gears to the PTO output shaft for rotation therewith, first and second independent PTO input gears rotatably mounted to said independent PTO input shaft and a second gear selection arrangement for selectively locking either one of said first and second independent PTO input gears to the independent PTO input shaft for rotation therewith, each of said PTO output gears being in constant meshing engagement with a corresponding one of the independent PTO input gears and drivingly coupled to the ground speed PTO input shaft; wherein the step of configuring the PTO gear arrangement to establish a torque transmission drive path between the independent PTO input shaft and the ground speed PTO input shaft comprises actuating the second gear selection arrangement to lock one of said independent PTO input gears for rotation with the independent PTO input shaft.

In accordance with a further aspect of the invention, there is provided a transmission arrangement for an agricultural vehicle comprising a range gearbox having an input shaft driveably connectable to a prime mover of the vehicle, an output shaft driveably connected to the input shaft to provide a number of drive ratios and operable in use to provide drive to at least one ground engaging member of the vehicle; an auxiliary drive shaft driveably connectable to the prime mover independently of the range gearbox input shaft; a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative in use for transferring drive from the independent PTO input shaft to the PTO output shaft when the independent PTO clutch is engaged and for transferring drive from the ground speed PTO input shaft to the PTO output shaft when the ground speed PTO clutch is engaged, the PTO gear arrangement being configured or configurable to provide a torque transmission drive path between the independent PTO input shaft and the ground speed PTO, the transmission arrangement comprising an electronical control system including an ECU operably connected with the PTO system and programmed to carry out the method according to any of the aspects of the invention set out above.

The electronic control system may be operatively connected with the independent PTO clutch and the ground speed PTO clutch so as to control engagement and disengagement of the PTO clutches. Where the PTO gear arrangement includes at least one optionally selectable gear which must be engaged to establish a torque transmission drive path between the independent PTO input shaft and the ground speed PTO input shaft, the electronic control system may be operatively connected to a gear selection arrangement so as to be able to control engagement and disengagement of said gear.

In accordance with a further aspect of the invention, there is provided a transmission arrangement for an agricultural vehicle comprising a range gearbox having an input shaft driveably connectable to a prime mover of the vehicle, an output shaft driveably connected to the input shaft to provide a number of drive ratios and operable in use to provide drive to at least one ground engaging member of the vehicle; an auxiliary drive shaft driveably connectable to the prime mover independently of the range gearbox input shaft; a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative in use for transferring drive from the independent PTO input shaft to the PTO output shaft when the independent PTO clutch is engaged and for transferring drive from the ground speed PTO input shaft to the PTO output shaft when the ground speed PTO clutch is engaged, the PTO gear arrangement comprising at least one independent PTO input gear fixed rotationally fast with the independent PTO input shaft and at least one independent PTO output gear rotatably mounted about the PTO output shaft in constant meshing engagement with said at least one independent PTO input gear and a gear selection arrangement for selectively locking said at least one independent PTO output gear for rotation with the PTO output shaft; wherein said at least one independent PTO output gear is provided as part of a compound gear together with a ground speed PTO output gear which is driving coupled with the ground speed PTO input shaft.

In accordance with a further aspect of the invention, there is provided a transmission arrangement for an agricultural vehicle comprising a range gearbox having an input shaft driveably connectable to a prime mover of the vehicle, an output shaft driveably connected to the input shaft to provide a number of drive ratios and operable in use to provide drive to at least one ground engaging member of the vehicle; an auxiliary drive shaft driveably connectable to the prime mover independently of the range gearbox input shaft; a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative in use for transferring drive from the independent PTO input shaft to the PTO output shaft when the independent PTO clutch is engaged and for transferring drive from the ground speed PTO input shaft to the PTO output shaft when the ground speed PTO clutch is engaged, wherein the PTO gear arrangement comprises a first shaft rotatably mounted about the PTO output shaft and a first gear selection arrangement for selectively locking said first shaft to the PTO output shaft for rotation therewith, a ground speed PTO output gear being fixed for rotation with said first shaft and drivingly coupled with the ground speed PTO input shaft; an independent PTO output gear rotatably mounted to said first shaft and a second gear selection arrangement for selectively locking said independent PTO output gear for rotation with said first shaft, said independent PTO output gear being in permanent meshing engagement with an independent PTO input gear fixed for rotation with the independent PTO input shaft.

There may be two independent PTO output gears mounted to said first shaft, each being in permanent meshing engagement with a respective independent PTO input gear fixed for rotation with the independent PTO input shaft, said second gear selection arrangement being configured to selectively lock either one of said two independent PTO output gears for rotation with said first shaft.

In accordance with a still further aspect of the invention, there is provided a transmission arrangement for an agricultural vehicle comprising a range gearbox having an input shaft driveably connectable to a prime mover of the vehicle, an output shaft driveably connected to the input shaft to provide a number of drive ratios and operable in use to provide drive to at least one ground engaging member of the vehicle; an auxiliary drive shaft driveably connectable to the prime mover independently of the range gearbox input shaft; a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative in use for transferring drive from the independent PTO input shaft to the PTO output shaft when the independent PTO clutch is engaged and for transferring drive from the ground speed PTO input shaft to the PTO output shaft when the ground speed PTO clutch is engaged, wherein the PTO gear arrangement comprises first and second PTO output gears rotatably mounted on the PTO output shaft and a first gear selection arrangement for selectively locking either one of said first and second PTO output gears to the PTO output shaft for rotation therewith, first and second independent PTO input gears rotatably mounted to said independent PTO input shaft and a second gear selection arrangement for selectively locking either one of said first and second independent PTO input gears to the independent PTO input shaft for rotation therewith, each of said PTO output gears being in constant meshing engagement with a corresponding one of the independent PTO input gears and drivingly coupled to the ground speed PTO input shaft.

In accordance with a further aspect of the invention, there is provided an agricultural vehicle having a transmission arrangement as set out above. The agricultural vehicle may be an agricultural tractor.

BRIEF DESCRIPTION OF THE DRAWINGS

Embodiments of the invention will now be described, by way of example only, with reference to the accompanying drawing, in which.

The drawings are provided by way of reference only, and will be acknowledged as not to scale.

DETAILED DESCRIPTION

Figure 1:
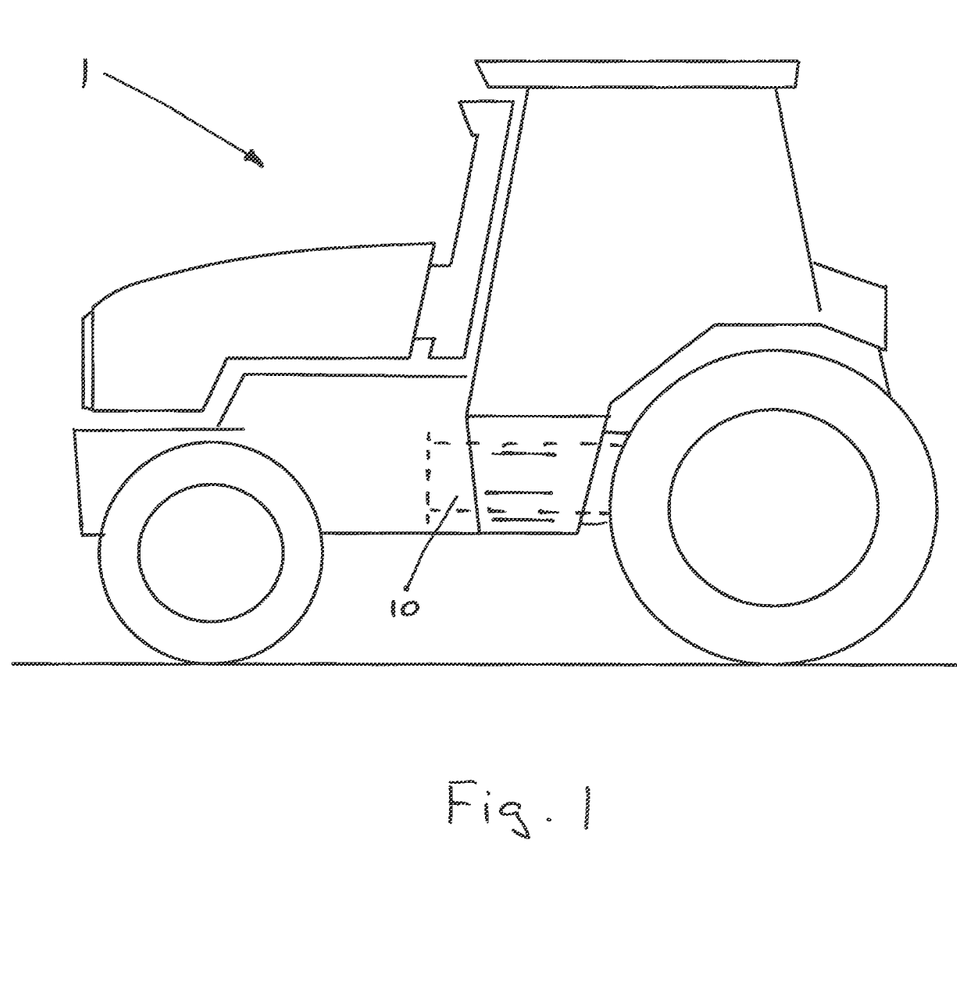
FIG. 1 is a schematic illustration of a tractor including a transmission arrangement according to an aspect of the invention and suitable for use in the method according to a further aspect of the invention.

FIG. 1 shows a tractor 1 including a transmission arrangement 10 in accordance with the invention, exemplary embodiments of which are shown in more detail in FIGS. 2 to 5. The transmission arrangement 10 may be housed in a common housing, or multiple housings attached to one another to form a singular common housing which is not shown. The common housing is suitable for attachment to a vehicle axle (especially a rear axle) and may form part of the chassis or be structurally load bearing in the case of a tractor transaxle.

Figure 2:
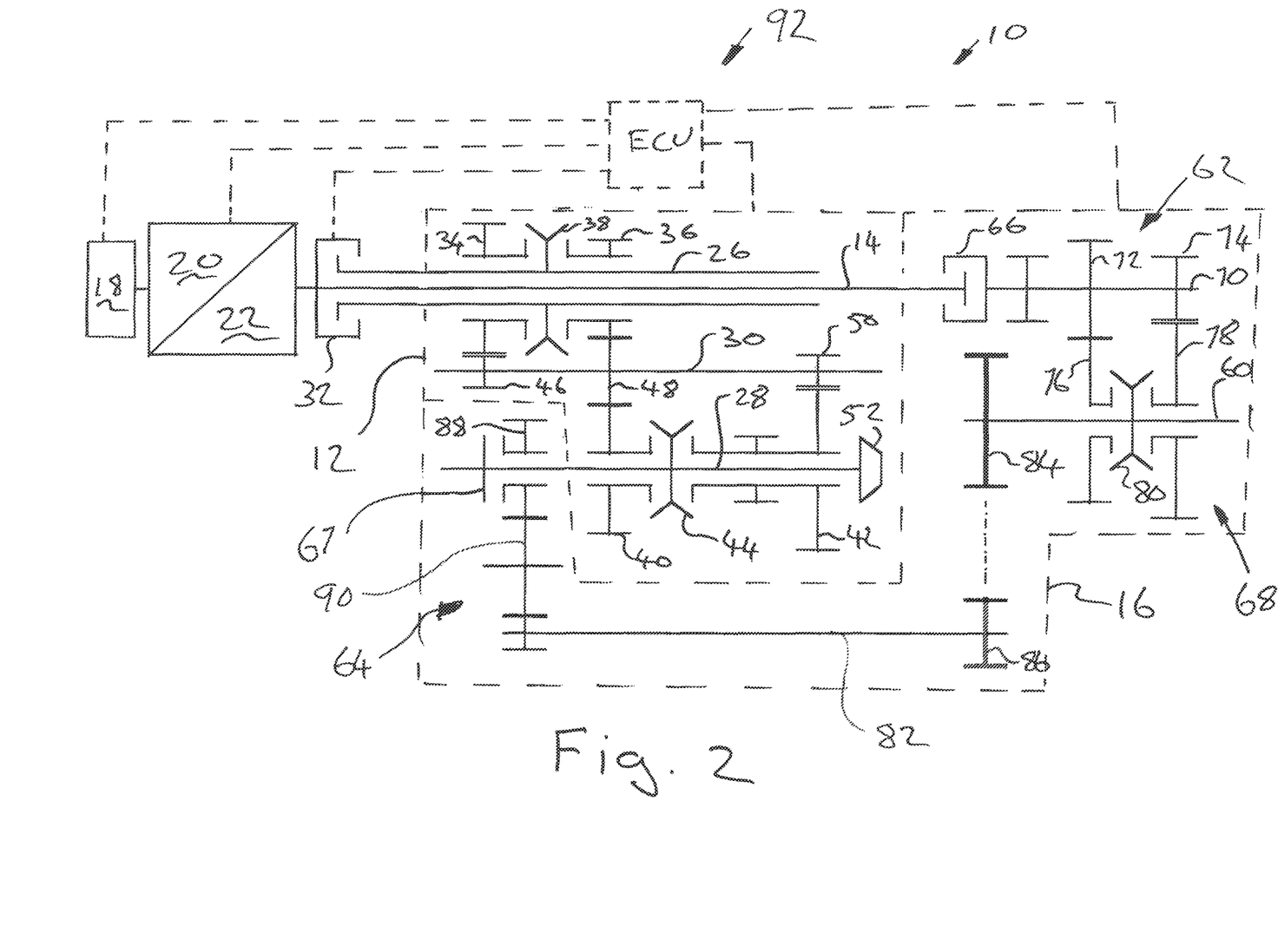
FIG. 2 is a schematic representation of a first embodiment of a transmission arrangement according to an aspect of the invention for use in the tractor of FIG. 1 and which is suitable for use in the method according to a further aspect of the invention.

With reference to FIG. 2, an exemplary schematic of a transmission arrangement 10 according to a first embodiment of the present invention is shown.

The transmission arrangement includes a range gearbox (indicated generally at 12), an auxiliary drive shaft 14, and a PTO system (indicated generally at 16).

It will be understood that the term "range gearbox" refers to a functional unit of the transmission for providing a number of selectable gear ratios. The term does not imply that the unit is in a separate housing or box from other functional units in the transmission which, as noted above, may be accommodated in a common housing.

FIG. 2 also shows a prime mover 18 of the vehicle, a power shuttle unit 20 and a PS unit 22 which optionally may form a part of a transmission in accordance with an aspect of the present invention.

The prime mover 18 is responsible for power generation for the vehicle and may for example comprise an internal combustion engine such a diesel engine or an electric generator powering a motor thereby providing electric drive, or indeed the prime mover 26 may be a hybrid drive system, for instance a diesel electric setup.

The prime mover may be of any suitable design and/or capacity to drive the transmission arrangement 10 and ultimately provide power to the driving wheels and the PTO.

The power shuttle unit 20 and PS unit 22 may also be of any suitable types and so are not shown in detail. Indeed, the power shuttle unit 20 and/or the PS unit 22 may be omitted or replaced by other functionally equivalent units. For example, the PS unit may be replaced by a CV transmission.

The auxiliary drive shaft 14 is driven by the prime mover and is used to provide drive for auxiliary systems of the vehicle such as a hydraulic system of the vehicle and an independent PTO as will be described in more detail below. Typically, the auxiliary shaft is driven at all times the prime mover is running and is rotated in a constant direction, which may correspond to that of the output shaft of the prime mover, e.g. clockwise.

The range gearbox 12 includes an input shaft 26, an output shaft 28 and a lay shaft 30. All three shafts are aligned with their axes parallel to one another and the auxiliary drive shaft 14.

The input shaft 26 is drivingly coupled with the prime mover through the power shuttle 20 and PS unit 22 which include clutch arrangements for selectively transmitting drive to the range gearbox input shaft 26. The clutch arrangements will typically include a forward clutch in the power shuttle unit 20 which is illustrated schematically at 32 and for simplicity will be referred to as a main clutch. However, it should be understood that reference to a main clutch herein, including the claims, is intended to cover any suitable clutch which is operative to engage and disengage drive from the prime mover to the input shaft 26.

In this embodiment, the input shaft 26 is a hollow shaft mounted concentrically about the auxiliary drive shaft 14 but this is not essential.

A first input stage gear 34 and a second input stage gear 36 are each rotatably mounted about the input shaft 26. A first gear selection system includes a gear selection synchronizer 38 which is operative to selectively lock one or other of the input stage gears 34, 36 for rotation with the input shaft. When an input stage gear 34, 36 is rotatably locked to the input shaft 26 by the synchronizer (that is to say the gear is selected) torque can be transmitted from the input shaft 26 to the selected input stage gear. When an input stage gear 34, 36 is not selected, it is free to rotate about the input shaft so that torque is not transmitted between the two.

Similarly, a first output stage gear 40 and a second output stage gear 42 are each mounted about the output shaft 28. A second gear selection system includes a further synchronizer 44 which is operative to selectively lock one or other of the output stage gears 40, 42 for rotation with the output shaft. When an output stage gear 40, 42 is rotatably locked to the output shaft 28 by the further synchronizer 44 (that is to say the gear is selected) torque can be transmitted from the selected gear to the output shaft 28. When an output stage gear 40, 42 is not selected, it is free to rotate about the output shaft 28 so that torque is not transmitted between the two.

The lay shaft 30 has a number of gears wheels permanently fixed for rotation with the shaft. These include:
- a first lay shaft gear 46 which is in constant meshing engagement with a first of the input stage gears 34;
- a second lay shaft gear 48 which is in constant meshing engagement with a second of the input stage gears 36 and with a first of the output stage gears 40; and
- a third lay shaft gear 50 which is in constant meshing engagement with a second of the output stage gears 42.

The lay shaft 30 and lay shaft gears 46, 48, 50 are operative to transmit drive between whichever of the input stage gears 34, 36 is selected and whichever of the output stage gears 40, 42 is selected to form a drive path from the input shaft to the output shaft. Accordingly, in use when one of the input stage gears 34, 36 is selected and one of the output stage gears 40, 42 is selected and the main clutch 32 engaged to so that the input shaft 26 is being driven, drive/torque will be transmitted through the selected input stage gear 34, 36, the lay shaft 30, and the selected output stage gear 40, 42 to the output shaft 28. The output shaft 28 is drivingly connected with a rear axle (as indicated schematically at 52) to drive the rear wheels and, optionally, with a front axle of the vehicle (as indicated schematically at 54) to drive the front wheels. By selecting different combinations of the input and output stage gears, four different gear ratios are provided. In the present embodiment, the range gear box provides four ranges, A, B, C and D. Range A is provided by selecting the second input stage gear 36 and the second output stage gear 42, range B is provided by selecting the first input stage gear 34 and the second output stage gear 42, range C is provided by selecting the second input stage gear 36 and the first output stage gear 40 and range D is provided by selecting the first input stage gear 34 and the first output stage gear 40.

In order to shift or change range gear, the main clutch 32 is disengaged so that drive to the input shaft 14 is interrupted so that the gear change synchronizers 38, 44 can then be actuated. When shifting between ranges A and B and between ranges C and D, only the first gear selection system comprising input stage synchronizer 38 needs to be actuated. When shifting between ranges B and C, both of the gear selection systems comprising input stage synchronizer 38 and output stage synchronizer 44 are actuated. In this case, the two synchronizers will usually be actuated in sequence.

The PTO system 16 includes a PTO output shaft 60, an independent PTO drive system 62 and a ground speed PTO drive system 64. The independent PTO drive system 62 provides drive to the PTO output shaft at one or more set speeds from the auxiliary drive shaft 14 through an independent PTO clutch 66. The ground speed PTO drive system 64 provides drive to the PTO output shaft a speed proportional to the ground speed of the vehicle from the output shaft 28 of the range gearbox 12 through a ground speed PTO clutch 67. The independent PTO drive system and the ground speed PTO drive system have a common PTO gear arrangement, indicated generally at 68.

In more detail, the independent PTO drive system comprises an independent PTO drive input shaft 70. The Independent PTO clutch 66 is operative when engaged to transmit torque (rotary drive) from the auxiliary drive shaft 14 to the independent PTO input shaft 70. A number of independent PTO input gears 72, 74 are fixed for rotation with the independent PTO input shaft. Two independent PTO output gears 76, 78 are rotatably mounted to the PTO output shaft 60. A gear selection arrangement includes a gear selector synchronizer 80 which is actuatable to selectively lock one or the other of the independent PTO output gears 76, 78 to the output shaft. When an independent PTO output gear 76, 78 is rotatably locked to the PTO output shaft 60 by the selector 80 (that is to say the gear is selected or engaged) torque can be transmitted from the independent PTO input shaft 70 to the PTO output shaft. A different gear ratio is provided depending on which independent PTO output gear 76, 78 is selected so that the PTO shaft may be driven at more than one set speed, e.g. 1000 rpm or 540 rpm. In use when the PTO output shaft 60 is to be rotated at a set speed, the appropriate independent PTO output gear 76, 78 is selected, the engine is operated at the required speed, and the independent PTO clutch 66 is engaged.

The ground speed PTO drive system 64 has a ground speed PTO input shaft 82 drivingly coupled with the PTO output shaft 60 at one end by means of a ground speed PTO output gear 84 fixed for rotation with the PTO output shaft 60 and a further gear 86 fixed for rotation with the independent PTO input shaft 82. The ground speed PTO output gear 84 and the further gear 86 are drivingly coupled, either by direct meshing engagement or through one or more intermediary gears illustrated schematically by the dash-dot line. At its other end, the independent PTO input shaft 82 is drivingly engageable with the output shaft 28 of the range gearbox through the independent PTO clutch 67. To this end, a ground speed PTO drive gear 88 is rotatably mounted to the output shaft 28 and the independent PTO drive clutch 67 is operative to lock the drive gear 88 to the output shaft 28 when engaged. An arrangement of meshing gears 90 is operative to transmit drive from the drive gear 88 to the ground speed PTO input shaft 82.

When the PTO output shaft 60 is to be driven at ground speed, the ground speed PTO clutch 67 is engaged so that drive is transmitted from the range gearbox output shaft 28 to the ground speed PTO input shaft 82 and from there to the PTO output shaft 80. When the ground speed PTO is in operation, the independent PTO clutch 66 is disengaged and the gear selector 80 may be set in a neutral position in which neither of the independent PTO output gears 76, 78 are locked to the PTO output shaft 60.

It will be noted that whenever either of the independent PTO output gears 76, 78 is locked to the PTO output shaft 60, a torque transmission drive path is formed from the independent PTO input shaft 70 to the ground speed PTO input shaft 82. Accordingly, if the auxiliary shaft 14 is being driven and the independent PTO clutch 66 is engaged whilst one of the independent PTO output gears 76, 78 is locked to the PTO output shaft 60, torque will be transferred from the auxiliary drive shaft 14 to the ground speed PTO input shaft 82. During normal use of the independent PTO, the ground speed PTO clutch 67 remains disengaged so that drive is not transmitted to the output shaft 28 of the range gearbox. However, in a method in accordance with an aspect of the present invention, use of this torque transmission drive path is made to transmit driving torque from the auxiliary drive shaft 14 to the output shaft 28 of the range gearbox during a change in the range gear.

When drive to the input shaft 26 of the range gearbox is interrupted (say by disengaging main clutch 32) in order to shift the range gear, normal drive to the driving wheels will also be interrupted as discussed above. To reduce this effect, torque is transmitted from the auxiliary drive shaft 14 to the output shaft 28 of the range gearbox during a change in the range gear by selecting one of the independent PTO output gears 76, 78 and engaging both the independent PTO clutch 66 and the ground speed PTO clutch. This reduces the effect of torque interruption during the shifting procedure, providing a smoother driving experience. When the gear change is completed and drive to the input shaft 26 of the range gearbox reinstated, drive between the auxiliary driveshaft 14 and the range gearbox output shaft 28 is disconnected by disengaging one or both of the PTO clutches 66, 67 and optionally actuating the gear selector 80 in the PTO gear arrangement 68 so that neither of independent PTO output gears 76, 78 is locked to the PTO output shaft.

The vehicle transmission includes a torque fill system (indicated generally at 92) which is operative to establish a torque transmission drive path between the auxiliary drive shaft 14 and the range gear output shaft 28 to transmit torque when required during a change in the range gear. This may require active engagement of both the independent PTO clutch 66 and the ground speed clutch 67 if they are disengaged and actuation of the gear selector 80 to select one of the independent PTO output gears 76, 78 if neither are selected. If actuation of the gear selector 80 is required, this will be carried out whilst the independent PTO clutch 66 and the ground speed PTO clutch are disengaged. However, it will be appreciated that one or other of the PTO clutches maybe pre-engaged, in which case only the disengaged clutch need be actively engaged. Similarly, one of the independent PTO output gears 76, 78 may already be selected, in which case the system 92 would not have to select one of these gears each time a change in range gear occurs.

The torque fill system 92 will typically include an electronic control system including a programmable electronic control unit (ECU) operatively connected with the range gearbox 12 and the PTO system 16. The ECU may also be operatively connected with the prime mover 18, the power shuttle unit 20, the PS unit 22, and/or the main clutch 32. The PTO clutches 66, 67 will typically have actuators which can be controlled by the electronic control system to enable them to be selective engaged and disengaged by the control system. Similarly, the gear selection arrangement 80 will have an actuator which can be controlled by the electronic control system to enable the control system to selectively engage either one of the independent PTO output gears 76, 78 or disengage them both. The actuators may be electro-mechanical or may be fluid controlled. The ECU may be programmed to actuate the torque fill system 92 and the various clutches as required, dependent on operating conditions of the vehicle. The control system may include various sensors to provide inputs indicative of the operating conditions of the vehicle. These may include sensors to indicate that a change of range gear has been requested or is required for example. The control system may also control actuation of the main clutch and co-ordinate engagement and disengagement of the PTO clutches with that of the main clutch. The ECU may be a vehicle ECU or it may be a separate, dedicated ECU which is in communication with a vehicle ECU, say by means of a CAN BUS interface. The various clutches can be of any suitable type.

The torque fill system 92 may be configured to enter a torque fill ready mode in which the PTO gear arrangement 68 is configured to transmit drive from the independent PTO input shaft 70 to the ground speed PTO input shaft 82, with one of the independent PTO output gears 76, 78 locked to the PTO output shaft 82. If required, the torque fill system may disengage the independent PTO and ground speed PTO clutches 66, 67 and actuate the gear selector 80 to lock one of the independent PTO output gears 76,78 to the PTO output shaft 82. Once the torque fill system is in a torque fill ready mode, torque may be transferred from the auxiliary drive shaft 14 to the output shaft 28 of the range gearbox when required during a change in range gear by engaging the PTO clutches 66, 67. Indeed, one of the PTO clutches 66, 67 might also be engaged in the torque fill ready mode once the gear arrangement is configured to transmit drive from independent PTO input shaft 70 to the ground speed PTO input shaft 82 so that only the remaining disengaged PTO clutch 66, 67 needs to be engaged to commence torque filling. Thus in operating conditions where a change in range gear might be expected and torque filling likely to be required, the torque fill system can enter the torque fill ready mode so that torque filling can be started and stopped as required during subsequently changes in range gear by engaging and disengaging one of the PTO clutches.

Actuation of the main clutch 32 and torque fill system 92 may be simultaneous or sequential and/or may overlap. If actuation is sequential, the torque fill system 92 is actuated to establish a torque transmission drive path between the auxiliary drive shaft 14 and the range gear output shaft 28 just after drive to the range gearbox input shaft 26 is interrupted and the torque fill system deactivated just before drive to the input shaft 26 is reinstated. However, the torque fill system 92 can be actuated to establish a torque transmission drive path between the auxiliary drive shaft 14 and the range gear output shaft 28 just before or at the same time as drive to the range gearbox input shaft 26 is interrupted and the torque fill system deactivated just after or at the same time as drive to the input shaft 26 is reinstated so that toque interruption to the driving wheels is minimized.

The torque fill system can be best utilized in transport or road mode, for example when shifting between ranges C and D, to provide uninterrupted torque and power to the wheels from 5 kph up to max driving speed. Heavy trailers and hilly conditions may require such high torque that range gear shifting is necessary. During shifting the range gears with a conventional transmission traction can be lost and vehicle speed may dramatically drop or vehicle can even stop when traveling uphill. With the help of torque fill system 92, range gear shifting can be made in the background while keeping motive force to the wheels. The torque fill system can also be usefully employed during field work, for example when shifting between ranges A and B.

As the torque fill system 92 provides a fixed gear ratio, it can only be used when the vehicle is in forward gear and the system is configured such that drive is transferred to the range gearbox output shaft in an appropriate rotary direction for forward drive. The gear ratio for the torque fill system 92 is selected to provide a smooth transition between the top of one range and the bottom of the next range, e.g. the gear ratio of the torque fill system 92 may be selected so that it matches, or fits between, the gear ratio at the top of range A and the bottom of range B, for example.

Figure 3:
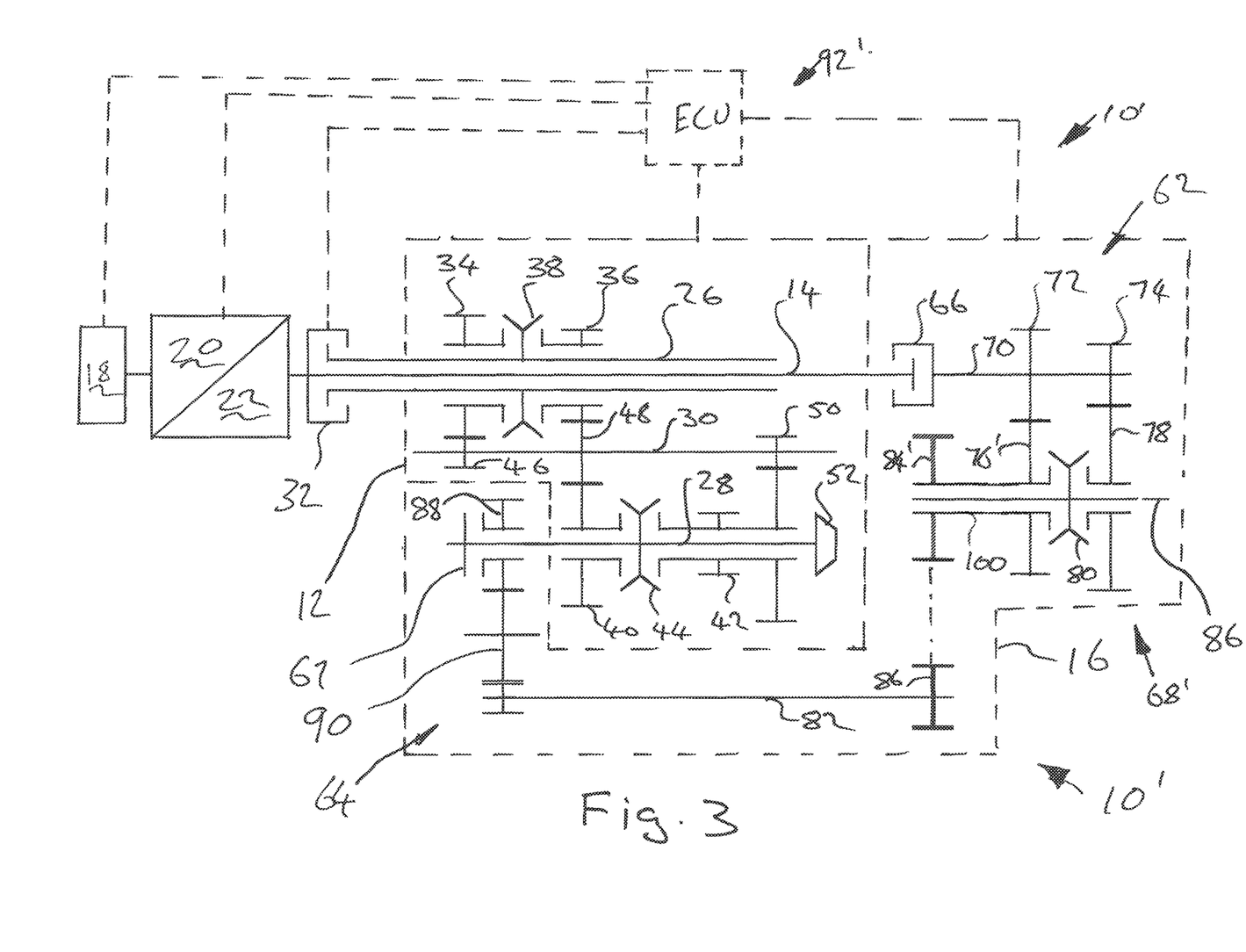
FIG. 3 is a schematic representation of a second embodiment of a transmission arrangement according to an aspect of the invention for use in the tractor of FIG. 1 and which is suitable for use in the method according to a further aspect of the invention.
Figure 4:
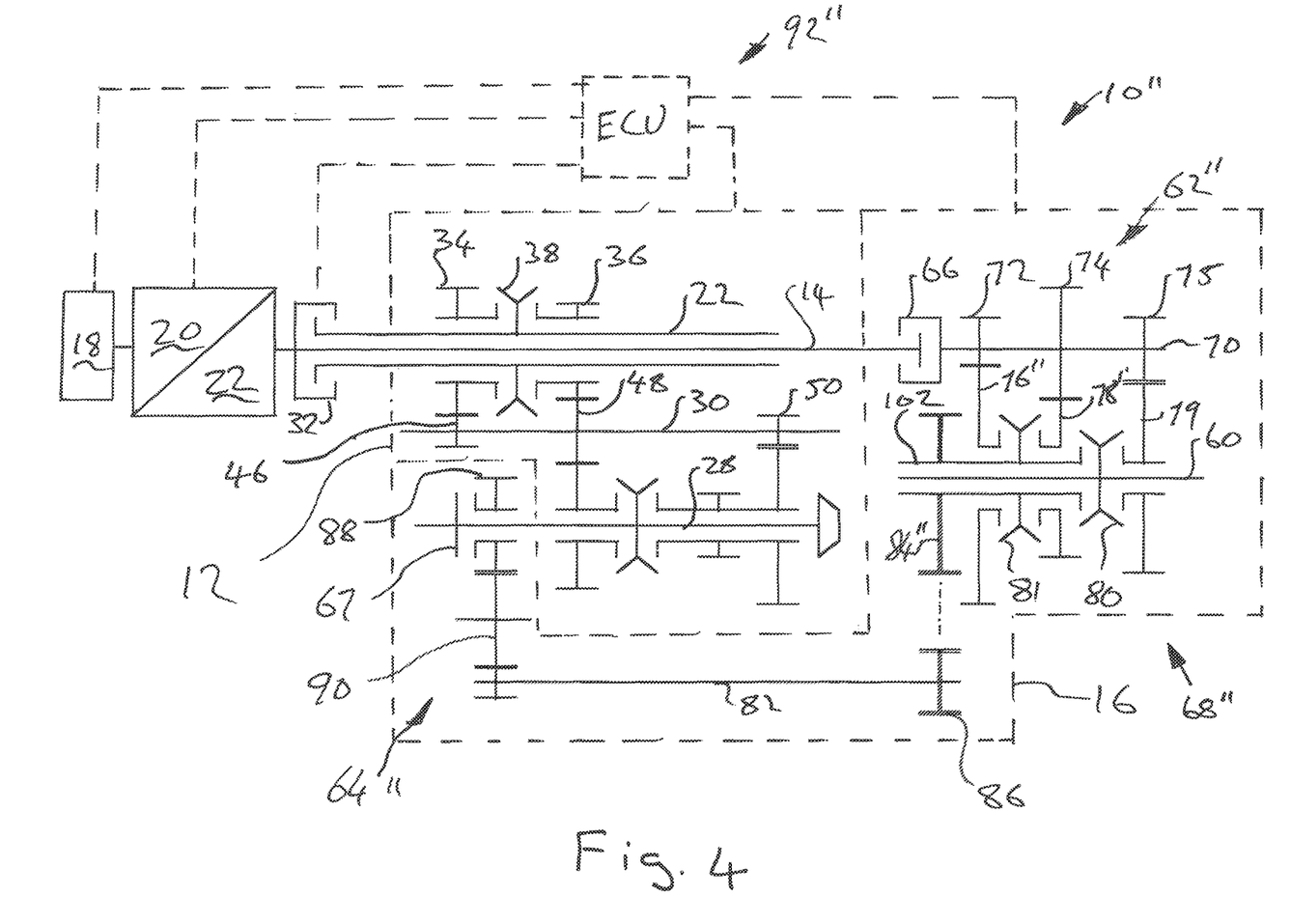
FIG. 4 is a schematic representation of a third embodiment of a transmission arrangement according to an aspect of the invention for use in the tractor of FIG. 1 and which is suitable for use in the method according to a further aspect of the invention.
Figure 5:
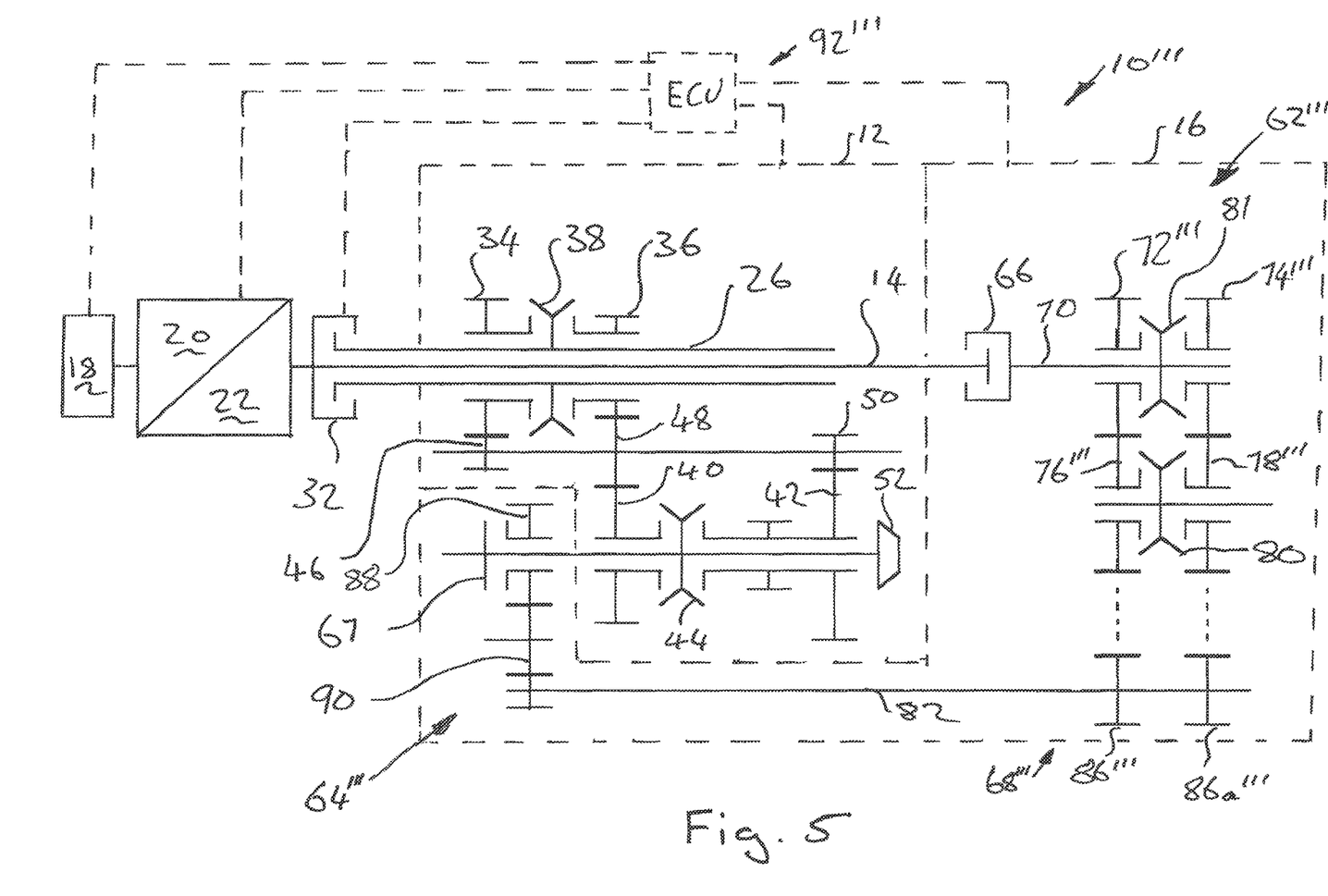
FIG. 5 is a schematic representation of a fourth embodiment of a transmission arrangement according to an aspect of the invention for use in the tractor of FIG. 1 and which is suitable for use in the method according to a further aspect of the invention.

FIGS. 3 to 5 illustrate alternative embodiments of a vehicle transmission in accordance with an aspect of the invention and which are adapted for use in the method according to another aspect of the invention. The same reference numerals are used to denote features which are the same as in the previous embodiment or which perform the same function. The majority of the transmission in these embodiments is the same as that of the first embodiment and so will not be described in detail. The only differences lie in the PTO gear arrangements 68', 68'', 68''' for transmitting drive to the PTO output shaft 82 from the independent PTO input shaft 70 and the ground speed PTO input shaft 82.

The transmission arrangement 10' as illustrated in FIG. 3 is similar to that of the previous embodiment except that the ground speed PTO output gear 84' and one of the independent PTO output gears 76' are both rotationally fast with a first hollow shaft 100 to form a compound gear. The first hollow shaft or compound gear 100 is mounted rotatably about the PTO output shaft 60 and may be selectively locked to the PTO output shaft using the gear selector synchronizer 80. Accordingly, when the ground speed PTO system is actuated, it is necessary to use the PTO gear selector synchronizer 80 to lock the first shaft/compound gear 100 to the PTO output shaft 60 in order that torque can be transferred from the ground speed input shaft 82 to the PTO output shaft 60. In this embodiment, drive is always transferred from the independent PTO input shaft 70 to the ground speed PTO input shaft 82 whenever the independent PTO clutch 66 is engaged and the auxiliary drive shaft 14 is being driven, with no requirement to lock the first shaft 100 to the PTO output shaft. Accordingly, the torque fill system 92 can be actuated by engaging the two PTO clutches 66, 67 with no requirement to use the PTO gear selector 80. It is a further advantage that drive does not have to be transferred to the PTO output shaft 60 during torque filling if neither the compound gear 100 nor the other of the independent PTO output gear 78 is locked to the PTO output shaft 82 by the gear selection synchronizer 80.

The transmission arrangement as illustrated in FIG. 3 can be used in the same way as the previous embodiment to temporarily transmit drive from the auxiliary drive shaft 14 to the driving wheels when the range gears are shifting by engaging both the independent and ground speed PTO clutches 66, 67 to establish a torque transmission drive path between the auxiliary drive shaft 14 and the output shaft 28 of the range gearbox.

The embodiment illustrated in FIG. 4 is similar to that of FIG. 3 in that the ground speed PTO output gear 84'' is rotationally fast with a first shaft 102 rotatably mounted concentrically about the PTO output shaft 60. A first PTO gear selection synchronizer 80 is operative to selectively lock either the first shaft 102 or a first independent PTO output gear 79 to the PTO output shaft. However, in this embodiment, two further independent PTO output gears 76'', 78'' are rotatably mounted about the first shaft 102 and a second gear selection synchronizer 81 is operative to selectively lock either one of the further independent PTO output gears 76'', 78'' to the first shaft. Three independent PTO input gears are fixed rotationally fast with the independent PTO input shaft, each being in constant meshing engagement with a respective one of the independent PTO output gears 76'', 78'', 79.

The independent PTO drive system is able to provide three different gear ratios. A first gear ratio is provided by using the first gear selector 80 to lock a first independent PTO output gear 79 to the PTO output shaft. A second gear ratio is provided by using the first gear selector 80 to lock the first shaft 102 to the PTO output shaft 82 and using the second gear selector 81 to lock a second of the independent PTO output gears 76'' to the first shaft. A third gear ratio is provided by using the first gear selector 80 to lock the first shaft 102 to the PTO output shaft 82 and using the second gear selector 81 to lock a third of the independent PTO output gears 78'' to the first shaft.

In this embodiment, it is necessary to lock the first shaft 102 to the PTO output shaft 60 in order to transmit drive from the ground speed PTO input shaft 82 to the PTO output shaft 60 when the ground speed PTO is in use. Furthermore, to configure the PTO gear arrangement to transmit torque from the independent PTO input shaft 70 to the ground speed PTO input shaft 82, it is necessary to lock one or other of the second and third independent PTO output gears 76', 78' to the first shaft 102 by means of the second gear selection synchronizer 81.

The transmission arrangement as illustrated in FIG. 4 can be used in the same way as the previous embodiments to temporarily transmit drive from the auxiliary drive shaft 14 to the driving wheels when the range gears are shifting. For this, one of the further independent PTO output gears 76'', 78'' must be locked to the first shaft 102 using the second gear selector 81 and both the independent and ground speed PTO clutches 66, 67 engaged to establish a torque transmission drive path between the auxiliary drive shaft 14 and the output shaft 28 of the range gearbox. As with the previous embodiment, drive does not have to be transferred to the PTO output shaft 60 during torque filling if neither of the first shaft 102 or the first independent PTO output gear 79 are locked to the PTO output shaft 82 by keeping the first the gear selector 80 in a neutral position.

FIG. 5 illustrates a still further layout of the PTO gear arrangement 68''' in which two PTO output gears 76''', 78''' are rotatably mounted about the PTO output shaft 82. A first gear selector synchronizer 80 is actuatable to selectively lock one or the other of the PTO output gears 76''', 78''' to the PTO output shaft 60 or to adopt a neutral position in which neither gear is locked to the PTO output shaft. Two independent PTO input gears 72''' 74''' are rotatably mounted about the independent PTO input shaft 70. A second gear selector synchronizer 81 is actuatable to selectively lock one or the other of the independent PTO input gears 72''', 74''' to the input shaft 70 or to adopt a neutral position in which neither gear is locked to the input shaft 70. Each of the PTO output gears 76''', 78''' is in permanent meshing engagement with a corresponding one of the independent PTO input gears 72''', 74'''. Each of the PTO output gears 76''', 78''' is also in permanent driving connection with the ground speed PTO input shaft 82 via a gear train including a respective ground speed PTO input gear 86''', 86a''' fixed rotationally fast with the ground speed PTO input shaft 82.

In use to provide an independent PTO drive to the PTO output shaft 60, one of the PTO output gears 76''', 78''' is rotationally locked to the PTO output gear by the first gear selector 80 and the corresponding independent PTO input gear is locked to the independent PTO input shaft 70 by the second gear selector 81 and the PTO clutch is engaged. Thus, if a first of the PTO output gears 76''' is selected, then the corresponding first independent PTO input gear 72''' is also selected. Alternatively, if a second of the PTO output gears 78''' is selected, then the corresponding second independent PTO input gear 74''' is also selected. In order to provide a ground speed PTO drive to the PTO output shaft 60, one or other of the PTO output gears 76''', 78''' is selected and the ground speed PTO clutch 67 is engaged.

In order to configure the PTO gear arrangement 68''' as shown in FIG. 5 to transmit torque from the independent PTO input shaft 70 to the ground speed PTO input shaft 82, one of the independent PTO input gears 72''', 74''' is locked to the independent PTO input shaft 70 but it is not necessary to lock either of the PTO output gears 76''', 78''' to the PTO output shaft. Accordingly, the torque fill system 92''' can be used without transmitting drive to the PTO output shaft 60.

The transmission arrangement 10''' as illustrated in FIG. 5 can be used in the same way as the previous embodiments to temporarily transmit drive from the auxiliary drive shaft 14 to the driving wheels when the range gears are shifting. For this, one of the independent PTO input gears 72''', 74''' is locked to the independent PTO input shaft 70 using the second gear selector 81 and both the independent and ground speed clutches 66, 67 are engaged to establish a torque transmission drive path between the auxiliary drive shaft 14 and the output shaft 28 of the range gearbox.

As noted above, the torque fill systems 92, 92', 92'', 92''' may adopted a torque fill ready mode in which the PTO gear arrangement 68, 68', 68'', 68''' is configured to be able to transmit torque from the independent PTO input shaft 70 to the ground speed PTO input shaft 82. In the embodiment shown in FIG. 3, the PTO gear arrangement 68' is permanently configured to transmit torque from the independent PTO input shaft 70 to the ground speed PTO input shaft 82 and so no action is required in this regard and torque filling can be controlled by engaging and disengaging the PTO clutches 66, 67. In the other embodiments, at least one selectable gear must be engaged in order to configure the PTO gear arrangement 68, 68'', 68''' such that torque can be transmitted from the independent PTO input shaft 70 to the ground speed PTO input shaft 82. In these embodiments, the PTO gear arrangement will be configured to be able to transmit torque from the independent PTO input shaft 70 to the ground speed PTO input shaft 82 by selecting an appropriate gear or gears, usually whilst the PTO clutches are disengaged. The transmission of torque from the auxiliary drive shaft 14 to the range gearbox output shaft 28 (torque filling) can then be controlled by engaging and disengaging the PTO clutches 66, 67 as required. However, it will be appreciated that one or other of the PTO clutches may be pre-engaged, in which case only the disengaged clutch need be actively engaged and disengaged to start and stop torque transfer from the auxiliary shaft 14 to the output shaft 28 of the range gear box.

For clarity reasons, the vehicle transmissions as illustrated in FIGS. 2 to 5 have been simplified to show only those details relevant to the present invention. An actual vehicle transmission incorporating a range gearbox 12 and torque fill drive system as illustrated will usually include a number of additional features or systems such as a crawler mode gear train, as well as various clutches and/or differentials for transmitting drive from the output shaft 28 of the range gearbox to the rear and/or front wheels of the vehicle.

The skilled person will understand that the shafts and gears in the aforementioned description and examples are of any suitable material and type and will include various periphery items such as supporting bearings and fasteners in order to make the transmission arrangement 10 operable.

The invention is not limited to the embodiments or examples described herein, and may be modified or adapted without departing from the scope of the present invention. For example, the number of selectable input stage gears and/or output stage gears in the range gearbox may be varied. Thus the range gearbox could include three or more selectable input stage gears and/or three or more selectable output stage gears as an example. Indeed, the invention is not limited to use in a transmission having a range gearbox comprising parallel input, output and lay shafts provided a torque transmission drive path can be established between an auxiliary drive shaft and the output shaft of a range gear box through a PTO system including an independent PTO drive system which can be coupled to the auxiliary shaft and a ground speed PTO drive system which can be coupled to the output shaft of the range gear box.

The invention claimed is:

1. A method of operating an agricultural vehicle comprising a range gearbox, an independent PTO system driven from an auxiliary drive shaft and a ground speed PTO system driven from an output shaft of the range gearbox, the method comprising:
    transferring torque from the auxiliary drive shaft to the output shaft of the range gear box via the independent PTO system and the ground speed PTO system while drive to the range gearbox is interrupted during a change in the range gear.

2. The method as claimed in claim 1, wherein the independent PTO system includes an independent PTO clutch engageable to transfer torque to the independent PTO system from the auxiliary drive shaft and the ground speed PTO system comprises a ground speed PTO clutch engageable to transfer torque between the output shaft of the range gearbox and the ground speed PTO system, the method comprising:
    engaging both the independent PTO clutch and the ground speed PTO clutch to transfer torque from the auxiliary drive shaft to the output shaft of the range gear box system.

3. The method as claimed in claim 2, wherein the independent and ground speed PTO systems share a common PTO output shaft and are configurable to enable torque to be transferred between the independent PTO system and the ground speed PTO system, the method comprising:

configuring the independent and ground speed PTO systems such that torque can be transferred between the independent PTO system and the ground speed PTO system.

4. A transmission arrangement for an agricultural vehicle comprising a range gearbox having an input shaft driveably connectable to a prime mover of the vehicle, an output shaft driveably connected to the input shaft to provide a number of drive ratios and operable to provide drive to at least one ground engaging member of the vehicle, an auxiliary drive shaft driveably connectable to the prime mover independent of the range gearbox input shaft, a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative for transferring drive from the independent PTO input shaft to the PTO output shaft when the independent PTO clutch is engaged and transferring drive from the ground speed PTO input shaft to the PTO output shaft when the ground speed PTO clutch is engaged, the PTO gear arrangement being configured or configurable to establish a torque transmission drive path between the independent PTO input shaft and the ground speed PTO input shaft, the transmission arrangement comprising an electronic control system including an ECU operably connected with the PTO system and programmed to carry out the method of claim 1.

5. An agricultural vehicle comprising the transmission arrangement of claim 4.

6. A method of operating an agricultural vehicle comprising a range gearbox having an input shaft driveably connectable to a prime mover of the vehicle, an output shaft driveably connected to the input shaft to provide a number of drive ratios operable to drive at least one ground engaging member of the vehicle, an auxiliary drive shaft driveably connectable to the prime mover independently of the range gearbox input shaft, a PTO transmission including a PTO output shaft, an independent PTO input shaft operably connectable to the auxiliary drive shaft through an independent PTO clutch, a ground speed PTO input shaft operably connectable to the output shaft of the range gearbox through a ground speed PTO clutch, and a PTO gear arrangement operative for transferring drive from the independent PTO input shaft to the PTO output shaft when the independent PTO clutch is engaged and for transferring drive from the ground speed PTO input shaft to the PTO output shaft when the ground speed PTO clutch is engaged, the PTO gear arrangement configured or configurable to enable torque from the independent PTO input shaft to be transferred to the ground speed PTO input shaft; the method comprising:
    transferring torque from the auxiliary drive shaft to the output shaft of the range gear box during a change in the range gear by engaging both the independent PTO clutch and the ground speed PTO clutch with the PTO gear arrangement configured to establish a torque transmission drive path between the independent PTO input shaft and the ground speed PTO input shaft.

7. The method as claimed in claim 6, wherein the PTO gear arrangement includes at least one optionally selectable gear which must be engaged to establish a torque transmission drive path between the independent PTO input shaft and the ground speed PTO input shaft, the method comprising: configuring the PTO gear arrangement to establish a torque transmission drive path between the independent PTO input shaft and the ground speed PTO input shaft by engaging the at least one gear.

8. The method of claim 6, wherein the ground speed PTO input shaft is permanently coupled with the PTO output shaft, the PTO gear arrangement comprising at least one independent PTO input gear fixed rotationally fast with the independent PTO input shaft and at least one independent PTO output gear rotatably mounted about the PTO output shaft in constant meshing engagement with the at least one independent PTO input gear and a gear selection arrangement for selectively locking the at least one independent PTO output gear for rotation with the PTO output shaft, wherein the method comprises configuring the PTO gear arrangement to establish a torque transmission drive path between the independent PTO input shaft and the ground speed PTO input shaft by operating the gear selection arrangement to lock the at least one independent PTO output gear for rotation with the PTO output shaft.

9. The method as claimed in claim 6, wherein the PTO gear arrangement comprises a first shaft rotatably mounted concentrically about the PTO output shaft and a first gear selection arrangement for selectively locking the first shaft to the PTO output shaft for rotation therewith, a ground speed PTO output gear being fixed for rotation with the first shaft and drivingly coupled with a further gear fixed for rotation with the ground speed PTO input shaft at least one independent PTO output gear rotatably mounted to the first shaft and a second gear selection arrangement for selectively locking the at least one independent PTO output gear for rotation with the first shaft, the at least one independent PTO output gear in permanent meshing engagement with an independent PTO input gear fixed for rotation with the independent PTO input shaft, wherein the method comprises:
    configuring the PTO gear arrangement to establish a torque transmission drive path between the independent PTO input shaft and the ground speed PTO input shaft by actuating the second gear selection arrangement to lock the at least one independent PTO output gear rotationally fast with the first shaft.

10. The method of claim 6, wherein the PTO gear arrangement comprises first and second PTO output gears rotatably mounted on the PTO output shaft and a first gear selection arrangement for selectively locking either of the first and second PTO output gears to the PTO output shaft for rotation therewith, first and second independent PTO input gears rotatably mounted to the independent PTO input shaft and a second gear selection arrangement for selectively locking either of the first and second independent PTO input gears to the independent PTO input shaft for rotation therewith, wherein each of the PTO output gears is in constant meshing engagement with a corresponding one of the independent PTO input gears and drivingly coupled to the ground speed PTO input shaft; wherein the method comprises:
    configuring the PTO gear arrangement to establish a torque transmission drive path between the independent PTO input shaft and the ground speed PTO input shaft by actuating the second gear selection arrangement to lock one of the independent PTO input gears for rotation with the independent PTO input shaft.

* * * * *